US012734636B2

(12) United States Patent
Chen

(10) Patent No.: US 12,734,636 B2
(45) Date of Patent: Sep. 15, 2026

(54) TOOL GRINDING MACHINE

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan City (TW)

( * ) Notice: Subject to any disclaimer, the term of this patent is extended or adjusted under 35 U.S.C. 154(b) by 745 days.

(21) Appl. No.: 17/830,611

(22) Filed: Jun. 2, 2022

(65) Prior Publication Data

US 2023/0390880 A1 Dec. 7, 2023

(51) Int. Cl.
*B24B 23/02* (2006.01)
*B23Q 11/12* (2006.01)

(52) U.S. Cl.
CPC ............ *B24B 23/02* (2013.01); *B23Q 11/127* (2013.01)

(58) Field of Classification Search
CPC ....... B24B 23/00; B24B 23/02; B24B 23/028; B24B 23/04; B24B 23/043; B24B 55/04; B24B 55/045; B24B 55/05; B24B 55/052; B24B 55/055; B23Q 11/127; B23Q 11/12; B23Q 11/00; B23Q 11/0003; B23Q 11/10; B23Q 11/1092; B23Q 11/126; B23Q 11/128; B24F 5/008; B25F 5/008

See application file for complete search history.

(56) References Cited

U.S. PATENT DOCUMENTS 4,612,734 A * 9/1986 Nakajima ............. B24B 55/102 451/358
7,270,598 B2 9/2007 Dutterer et al.
2009/0218113 A1* 9/2009 Johnen ................. B23Q 11/127 173/171
2013/0038148 A1* 2/2013 Chen ...................... H02K 7/145 310/50
2015/0209949 A1* 7/2015 Milbourne .............. B24B 23/04 29/434
2019/0305640 A1* 10/2019 Duernegger ............. H02K 9/06

FOREIGN PATENT DOCUMENTS

CN 101636245 B 7/2012
CN 214393694 U * 10/2021
TW I751912 B 1/2022

* cited by examiner

*Primary Examiner* — Joel D Crandall
*Assistant Examiner* — Kent N Shum
(74) *Attorney, Agent, or Firm* — MUNCY, GEISSLER, OLDS & LOWE, P.C.

(57) ABSTRACT

A tool grinding machine comprises a casing formed with at least one air inlet and at least one first air outlet; a driving component disposed in the casing; and a diversion structure. The driving component comprises a motor with a motor housing; and an airflow generator rotating synchronously with the motor and located at an end of the motor that is not connected to a grinding member. The motor housing comprises at least one first opening and at least one second opening communicating with an interior of the motor. The diversion structure is disposed in the casing or on the motor housing, and the diversion structure is provided to enable the tool grinding machine to define a first airflow path, which is composed of the air inlet, the first opening, the interior of the motor, the second opening, the airflow generator and the first air outlet sequentially.

11 Claims, 9 Drawing Sheets

20
216
26
217
213
271
272
273
22
222
221
224
212
215
211
21
218
25
214
27
274
229
223

218
26
217
25
31
272
213
271
230
273
31
27
222
274
22
221
229
224
223
30
233
24(241)
214
212
226
215
211
231

26
217
218
271
275
25
31
213
230
234
227
222
30
212
224
223
221
211
229
233
231
214
232
239
225
228
27

TOOL GRINDING MACHINE

FIELD OF THE INVENTION

The invention relates to a tool grinding machine, and more particularly to a tool grinding machine capable of enabling a heat-dissipating airflow to enter an interior of a motor and providing heat dissipation to a part of a casing for gripping.

BACKGROUND OF THE INVENTION

Although most of the existing tool grinding machines are equipped with an airflow generator linked with the motor to dissipate the heat of the tool grinding machine in operation through the airflow generator. As disclosed in CN 101636245B, in the design of the tool grinding machine, the airflow generator is disposed between the motor and the grinding member, and therefore the main object of the airflow generator is not to dissipate heat, but to discharge dust, heat dissipation is just an additional effect. When the airflow generator acts, the opening provided at the handle will be used as an air inlet to generate wind current in the casing of the tool grinding machine. The wind current passes through the outside of the motor, and is finally discharged at the part of the casing facing toward the grinding member. The wind current path designed in such a way is too long, and the effect of dissipating heat is limited. Furthermore, in order to enhance the user's experience of gripping, the existing tool grinding machines are designed with a structure that is easy to grip, which makes the problem of heat dissipation in the casing of the tool grinding machine more obvious.

If the tool grinding machine is implemented by adopting the aforementioned configuration of the airflow generator, the temperature inside the casing will rise significantly due to the heat generated during the operation of the motor, and the temperature of the casing surface will also rise significantly with the rise in temperature inside the casing, and the user's palm will feel the significantly increased temperature of the casing surface, which is detrimental to the experience for use.

In order to solve the aforementioned problem that heat dissipation inside the tool grinding machine is not easy, U.S. Pat. No. 7,270,598 discloses a technical solution for the tool grinding machine, external air is introduced into the interior of the tool grinding machine to dissipate heat. In the patent, when the dusty gas generated by grinding is sucked by the dust suction pipe, the gas pressure inside the tool grinding machine changes, so that the external air can enter the interior of the tool grinding machine through the air inlet and then enter the dust suction pipe, and the external air travels through the motor and dissipates heat from the motor as it flows in the direction of the dust suction pipe. However, the structure disclosed in U.S. Pat. No. 7,270,598 cannot be applied to tool grinding machines implemented by gripping, because the position of the air inlet is at the top of the casing, if such a design is adopted, the user will block the air inlet while gripping the tool grinding machine, causing poor air intake effect of the air inlet, and the heat dissipation effect on the motor is reduced.

In addition, although technical solutions that can reduce the temperature in the casing are disclosed in the TW 1751912 that belongs to the applicant of the present invention, with the wind current inlet disposing at the body of the casing, the wind current outlet disposing at the head of the casing, and the airflow generator disposing near the wind current outlet, such dispositions will have the problem of causing the wind current path to be too long, resulting in limited heat dissipation effect. In addition, the patent TWI751912 did not provide a technical solution to dissipate heat inside the motor, thus the problem of waste heat accumulation inside the motor is still obvious.

SUMMARY OF THE INVENTION

A main object of the invention is to solve the problem that the conventional hand-held tool grinding machine does not have an ability to dissipate heat inside a motor, resulting in a significant temperature rise of a casing.

A secondary object of the invention is to solve the problem that temperature rise of a casing is still obvious due to a heat dissipation wind current path of the conventional hand-held tool grinding machine being too long.

In order to achieve the above objectives, the invention provides a tool grinding machine comprising a casing, a driving component, and a diversion structure. The casing is provided for operating the tool grinding machine in a gripping manner, and the casing is formed with at least one air inlet and at least one first air outlet. The driving component is installed in the casing, and the driving component comprises a motor and an airflow generator that rotating synchronously with the motor, wherein the motor comprises a stator, a rotor, an output shaft assembled with the rotor, and a motor housing disposed around the stator and the rotor, and wherein the output shaft comprises a first end facing the casing and assembled with the airflow generator, and a second end opposite from the casing and assembled with a grinding member, and wherein the motor housing comprises at least one first opening generating a ventilation relationship with the at least one air inlet, and at least one second opening communicating with an interior of the motor and facing the airflow generator. The diversion structure is disposed at one of two positions including inside the casing and on the motor housing, the diversion structure is provided to enables the tool grinding machine to define a first airflow path which is composed of the at least one air inlet, the first opening, the interior of the motor, the second opening, the airflow generator and the at least one first air outlet in sequence.

In one embodiment, the diversion structure is disposed in the casing and is interposed between the at least one first air outlet and the at least one air inlet.

In one embodiment, the diversion structure is a baffle formed on the motor housing and contacting an inner wall of the casing after the motor housing is assembled.

In one embodiment, an interior of the casing is divided into a motor space and a grinding space separated from the motor space, and the first airflow path only performs in the motor space.

In one embodiment, the casing is divided into a head for gripping and a body, the casing is composed of at least two shells, and the motor housing is connected to one of the at least two shells.

In one embodiment, the motor housing comprises a protruding rib formed on a bottom edge of the motor housing and in contact with an inner wall of the casing, and the protruding rib divides the interior of the casing into the motor space and the grinding space.

In one embodiment, the motor comprises an end plate mounted on an end of the motor housing without forming the second opening, and the end plate provides the stator to be fixed thereon.

In one embodiment, the casing is divided into a head for gripping and a body, the casing comprises a manipulation pressing plate assembled on the body, and at least one second air outlet, the tool grinding machine comprises a deflector disposed in the casing and located at a junction of the head and the body, the deflector is provided to enable the tool grinding machine to define a second airflow path which is composed of the at least one air inlet, the first opening, the interior of the motor, the second opening, the airflow generator and the at least one second air outlet in sequence.

In one embodiment, the deflector comprises an air guiding part facing the body, and the air guiding part comprises a main guide surface and two auxiliary guide surfaces respectively connected to two sides of the main guide surface.

In one embodiment, the auxiliary guide surface is composed of a plurality of arcuate surfaces.

In one embodiment, the deflector is in an arcuate shape, and the deflector comprises two flow stop blocks respectively disposed at two ends of the deflector.

In one embodiment, a level height of the at least one first air outlet on the casing is higher than a level height of the at least one air inlet on the casing.

In one embodiment, the casing comprises at least one dust filter disposed at the air inlet.

In one embodiment, the airflow generator is a centrifugal fan.

Accordingly, compared with the prior art, the invention has the following features that the first airflow path is generated inside the tool grinding machine through the diversion structure, the air inlet and the first air outlet on the casing, and the first opening and the second opening on the motor housing, so that the problem of severe temperature rise in the motor and on the casing surface can be specifically solved since the first airflow path flowing through the interior of the motor, thereby avoiding a user's palm to feel obvious temperature rise. In addition, the first airflow path of the invention is shorter than that of the prior art, thus capable of further enhancing a heat dissipation effect.

DETAILED DESCRIPTION OF THE PREFERRED EMBODIMENTS

Figure 1:
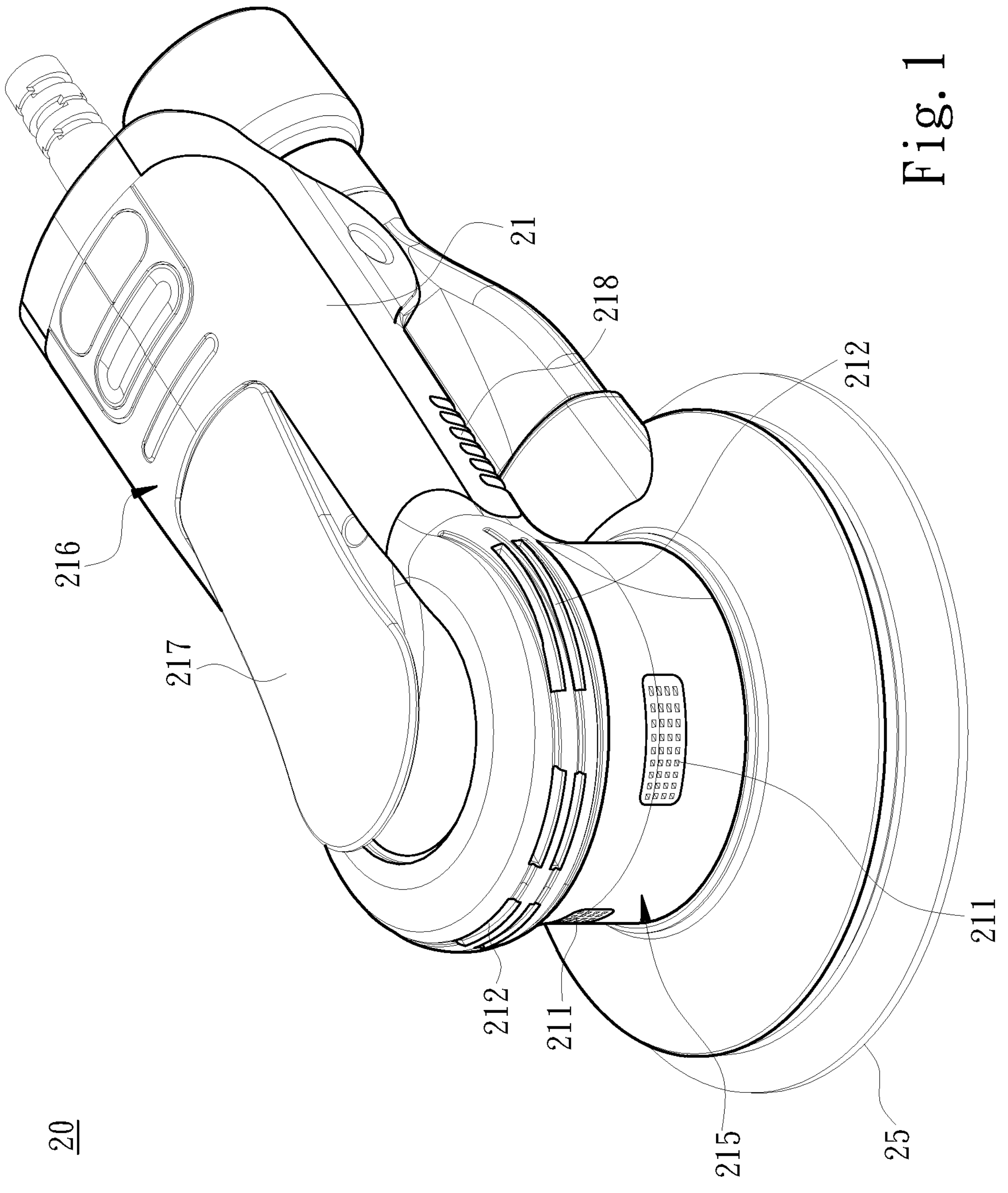
FIG. 1 is a perspective structural view of an embodiment of a tool grinding machine of the invention.

The detailed description and technical content of the invention are described below with reference to the accompanying drawings.

Please refer to FIG. 1, FIG. 2, FIG. 3, FIG. 4, FIG. 5 and FIG. 6, the invention provides a tool grinding machine 20, the tool grinding machine 20 comprises a casing 21, a driving component 22, and a diversion structure 24. Wherein the casing 21 is provided for a user to operate in a gripping manner, a position where the user grips the casing 21 is just above the driving component 22. More specifically, the user's palm is located at a position above the driving component 22. The casing 21 is formed with at least one air inlet 211 and at least one first air outlet 212, wherein a level height of the first air outlet 212 on the casing 21 is higher than a level height of the air inlet 211 on the casing 21, which means that the air inlet 211 is closer to a working surface of the tool grinding machine 20 where grinding operation is performed. In order to prevent dust from entering the air inlet 211, in one embodiment, the casing 21 comprises at least one dust filter disposed at the air inlet 211, and the dust filter can be a filter screen or a filter cotton that does not excessively affect airflow. Furthermore, the first air outlet 212 is not disposed on a top of the casing 21, that is, exhaustion of the first air outlet 212 is not affected when the user gripping the casing 21.

In addition, the driving component 22 is installed in the casing 21, and the driving component 22 comprises a motor 221, and an airflow generator 222 that rotates synchronously with the motor 221. The motor 221 comprises a stator 223, a rotor 224, an output shaft 225 assembled with the rotor 224, and a motor housing 226 disposed around the stator 223 and the rotor 224. The output shaft 225 has a first end 227 and a second end 228 opposite to the first end 227. Directions shown in the tool grinding machine 20 in FIG. 6 are taken as an example, the first end 227 is a top end of the output shaft 225, the second end 228 is a bottom end of the output shaft 225, the first end 227 faces an interior of the casing 21 and is assembled with the airflow generator 222, and the second end 228 is assembled with a grinding member 25. It can be known from the foregoing that if the grinding member 25 is located below the motor 221, the airflow generator 222 will be located above the motor 221. In addition, a level height of the airflow generator 222 in the casing 21 can be the same as that of the first air outlet 212, or close to the height of the first air outlet 212. When the airflow generator 222 is running, an airflow with an axial direction different from that of the output shaft 225 is generated. The airflow generator 222 is a centrifugal fan. The airflow generator 222 faces the first air outlet 212. The airflow generator 222 comprises a plurality of fan blades 236, and a ring plate 237 provided for the plurality of fan blades 236 to be disposed thereon. The plurality of fan blades 236 are arranged to form an impeller, and the airflow generator 222 emits airflow from between any two of the fan blades 236 adjacent to each other. Further, distances between the any two of the fan blades 236 adjacent to each other are not equidistant, but the distances between the two adjacent fan blades 236 from an inner edge of the ring plate 237 toward an outer edge of the ring plate 237 are gradually increased. When the motor 221 is adopted an external rotor design, the ring plate 237 can be a part of the rotor 224. In addition, in one embodiment, the airflow generator 222 comprises a connecting ring 238, the connecting ring 238 and the ring plate 237 are separately disposed at two ends of the plurality of fan blades 236 respectively. A size of the connecting ring 238 is not limited to be equal to that of the ring plate 237. In addition, the motor housing 226 comprises at least one first opening 229 and at least one second opening 230, the first opening 229 is located at a side of the motor housing 226, the first opening 229 and the air inlet 211 form a ventilation relationship. Further, in one embodiment, the first opening 229 directly faces the air inlet 211. In addition, the second opening 230 communicates with an interior of the motor 221 and faces the airflow generator 222. Taking the directions of the tool grinding machine 20 as shown in FIG. 2, FIG. 3, FIG. 4, FIG. 5 and FIG. 6 as an example, the second opening 230 is located at a top of the motor housing 226. Furthermore, in this embodiment, the motor 221 is adopted an external rotor design, the rotor 224 is disposed outside the stator 223, and at least one through-hole 234 is formed on a side of the rotor 224 facing the airflow generator 222.

Figure 6:
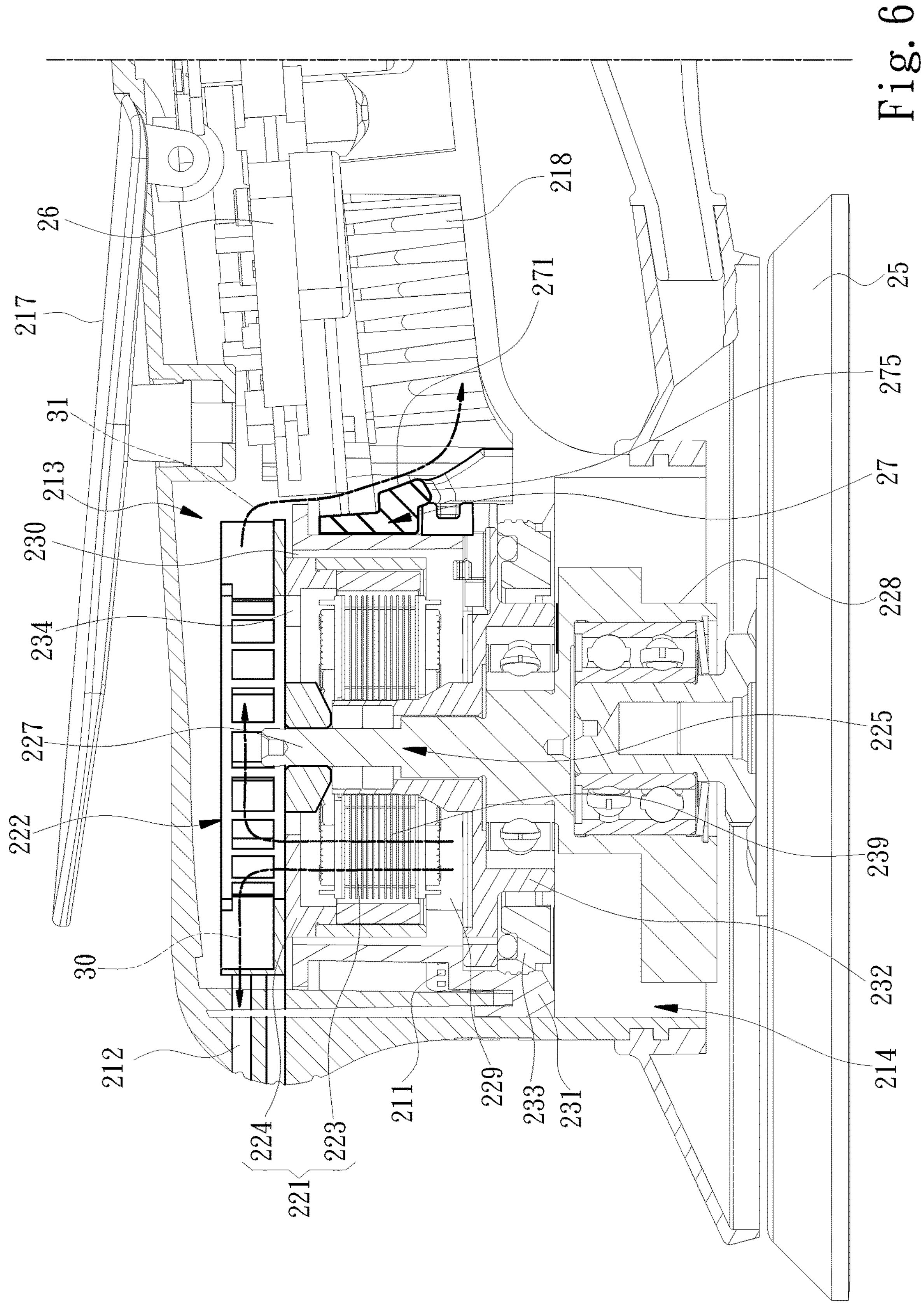
FIG. 6 is a second cross-sectional partial structural view of an embodiment of the tool grinding machine of the invention.
Figure 7:
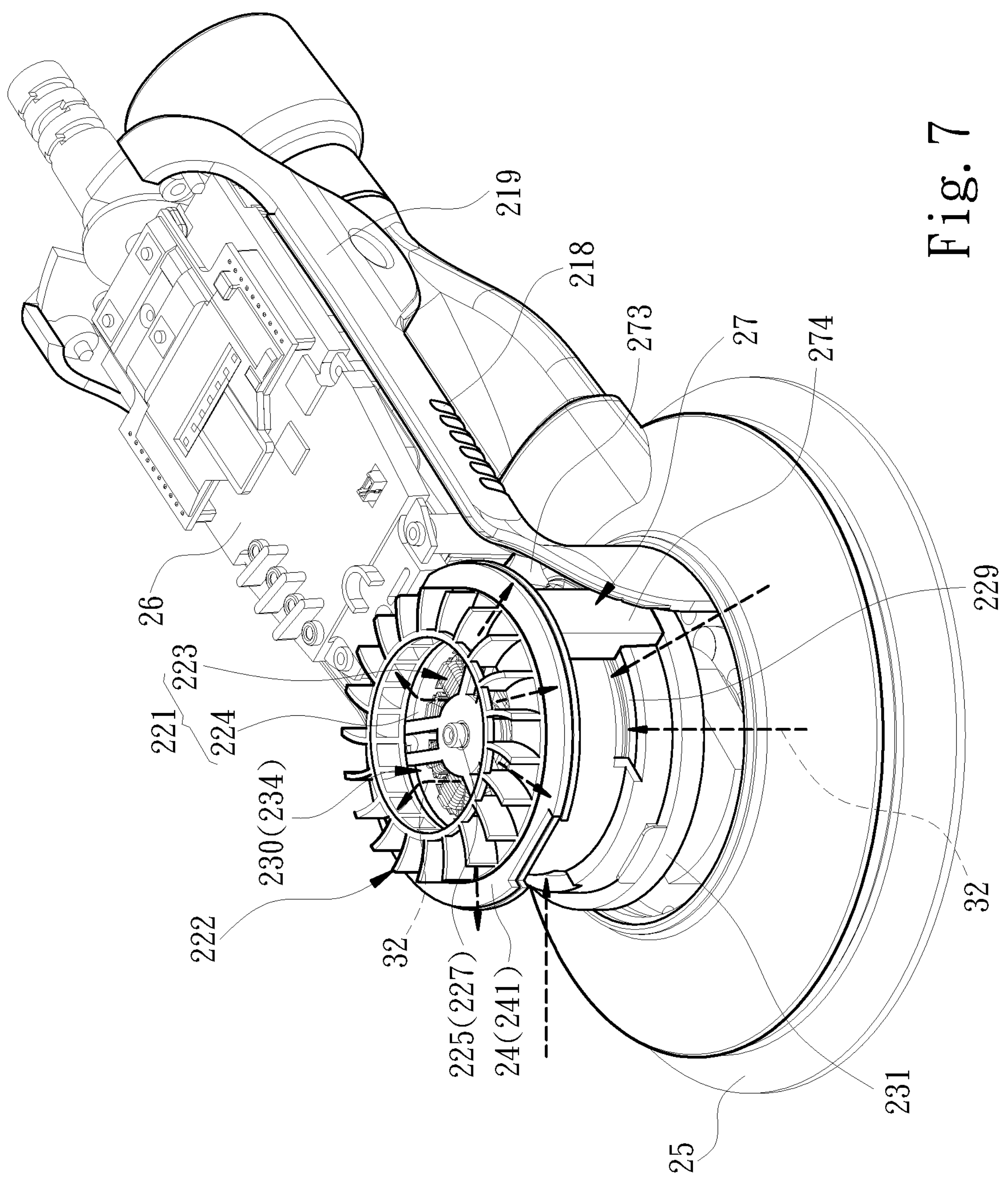
FIG. 7 is a perspective partial view of an airflow path of an embodiment of the tool grinding machine of the invention.
Figure 8:
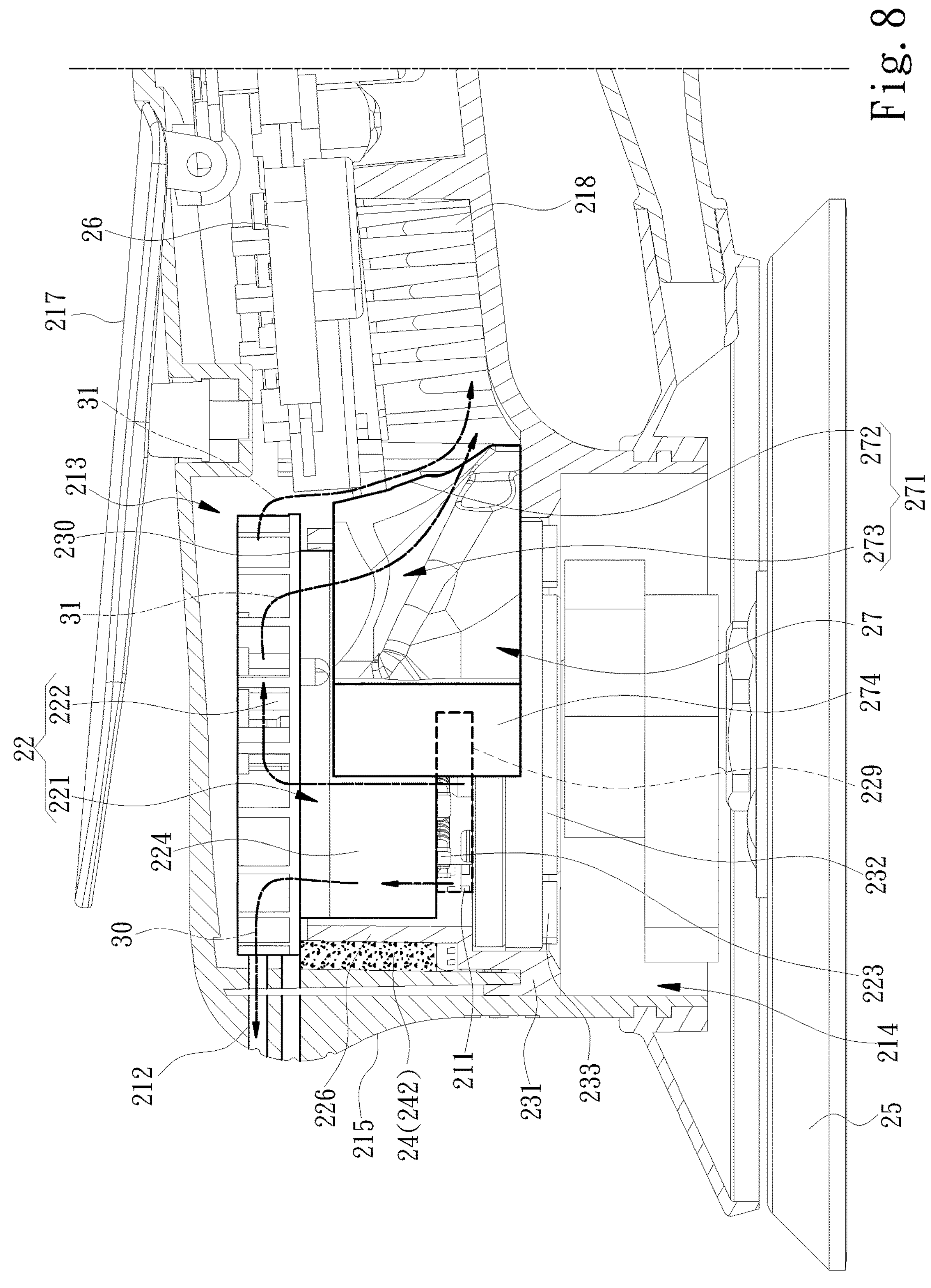
FIG. 8 is a cross-sectional partial structural view of another embodiment of the tool grinding machine of the invention.

The diversion structure 24 of the invention is disposed inside the casing 21 or on the motor housing 226. FIG. 5 shows that the diversion structure 24 is disposed on the motor housing 226, and FIG. 8 shows that the diversion structure 24 is disposed inside the casing 21. Hereinafter, the embodiment shown in FIG. 5 will be used for explanation, but it is not limited thereto. Please refer to FIG. 5 and FIG. 6, a purpose of the diversion structure 24 of the invention is to make an airflow entering from the air inlet 211 and then entering the interior of the motor 221 through the first opening 229 only. The diversion structure 24 enables the tool grinding machine 20 to define a first airflow path 30, and the first airflow path 30 is composed of the air inlet 211, the first opening 229, the interior of the motor 221, the second opening 230, the airflow generator 222 and the first air outlet 212 in sequence. Accordingly, when the airflow generator 222 rotates, an airflow (as shown 32 in FIG. 7) entering from the air inlet 211 moves along the first airflow path 30 and dissipates heat inside the motor 221 along the way, that is, the airflow (as shown 32 in FIG. 7) will dissipate heat from a plurality of coils 239 disposed on the stator 223 or the rotor 224 in the motor 221, thereby greatly reducing waste heat accumulated during operation of the motor 221, so that a part of the casing 21 for providing the user gripping will not be significantly heated, and the user's palm will not feel uncomfortable during operation due to obvious temperature rise of the casing 21.

Please refer to FIG. 5 again, when the diversion structure 24 is installed on the motor housing 226, the diversion structure 24 is a baffle 241 disposed on the motor housing 226, and the baffle 241 is in contact with an inner wall of the casing 21 after the motor housing 226 is assembled to prevent direct communication between the air inlet 211 and the first air outlet 212. In the embodiment shown in FIG. 5, the baffle 241 is formed by extending a top edge of the motor housing 226, but the invention is not limited thereto. Please refer to FIG. 8. In another embodiment, when the diversion structure 24 is disposed inside the casing 21, the diversion structure 24 is interposed between the first air outlet 212 and the air inlet 211. Further, the diversion structure 24 does not necessarily have to be integrally formed by the casing 21, but can be an independent component provided in the casing 21, such as a soft air choke member 242, which is capable of adapting to an inner space of the casing 21 and generating an air choking effect. Furthermore, inside the casing 21 can also be equipped with structures for assembling and positioning the diversion structure 24, such as protruding block, tenon, and the like.

Please refer to FIG. 5 and FIG. 6 again, an interior of the casing 21 is divided into a motor space 213 and a grinding space 214 separated from the motor space 213, and the first airflow path 30 only performs in the motor space 213. More specifically, the motor housing 226 comprises a protruding rib 231 formed on a bottom edge of the motor housing 226 to be in contact with an inner wall of the casing 21, and the casing 21 is divided into the motor space 213 and the grinding space 214 by the protruding rib 231. In one embodiment, the motor 221 comprises an end plate 232 mounted on an end of the motor housing 226 without forming the second opening 230, the end plate 232 not only provides the stator 223 to be fixed thereon, but also closes an end of the motor housing 226 that is originally opened, so that an airflow entering from the first opening 229 can only flow toward a direction of the second opening 230. In one embodiment, the motor 221 comprises an airtight support ring 233 that is assembled with the motor housing 226 to support the end plate 232, the airtight support ring 233 and the end plate 232 cooperate with the protruding rib 231 in order to divide the interior of the casing 21 into the motor space 213 and the grinding space 214, and it should be understood that the motor space 213 and the grinding space 214 are not communicated with each other in the invention.

Figure 4:
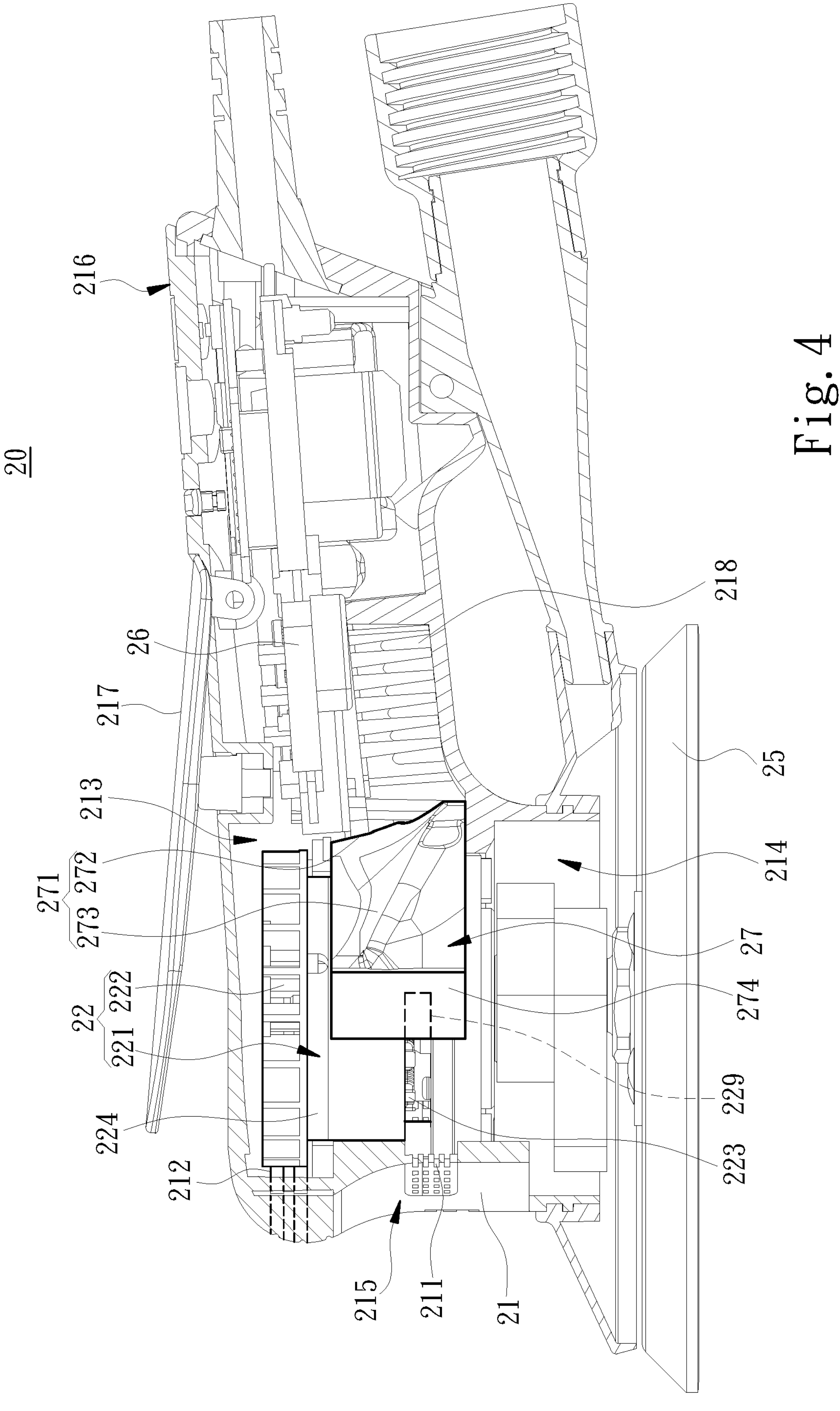
FIG. 4 is a cross-sectional structural view of an embodiment of the tool grinding machine of the invention.
Figure 5:
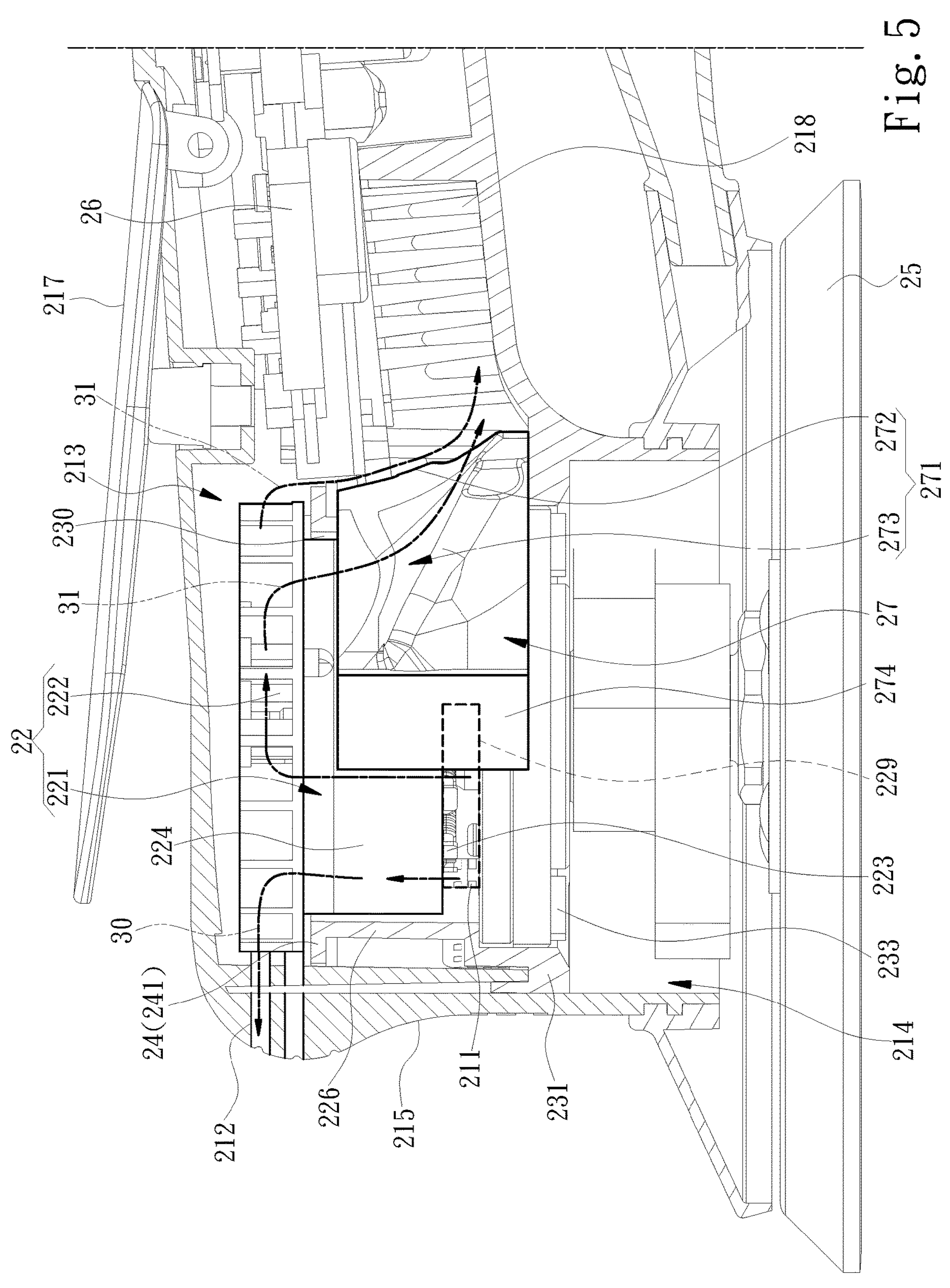
FIG. 5 is a first cross-sectional partial structural view of an embodiment of the tool grinding machine of the invention.

Please refer to FIG. 4, FIG. 5 and FIG. 6 again, based on a shape of the casing 21, the casing 21 is divided into a head 215 for gripping and a body 216. The casing 21 further comprises a manipulation pressing plate 217 assembled on the body 216, and at least one second air outlet 218. On the other hand, the tool grinding machine 20 comprises a circuit board 26 and a deflector 27, the circuit board 26 and the deflector 27 are both disposed in the casing 21. The circuit board 26 is located in the body 216 and electrically connected to the motor 221 to control operation of the motor 221. The deflector 27 is disposed at a junction of the head 215 and the body 216. The deflector 27 enables the tool grinding machine 20 to define a second airflow path 31, and the second airflow path 31 is composed of the air inlet 211, the first opening 229, the interior of the motor 221, the second opening 230, the airflow generator 222 and the second air outlet 218 in sequence. It can be known from the foregoing that a starting point of the second airflow path 31 is also the air inlet 211, and also passes through the first opening 229, the interior of the motor 221, and the airflow generator 222 to dissipate heat of a part of the casing 21 where the user gripped, the second airflow path 31 then enters the body 216, so that heat of the circuit board 26 located in the body 216 can be dissipated, and finally is discharged from the second air outlet 218. Please refer to FIG. 9, and in accordance with the above, in one embodiment, the deflector 27 comprises an air guiding part 271, and the air guiding part 271 guides an airflow moving along the second airflow path 31 to descend at the air guiding part 271, and to move toward the second air outlet 218. The air guiding part 271 comprises a main guide surface 272 and two auxiliary guide surfaces 273 respectively connected to two sides of the main guide surface 272. Further, the auxiliary guide surface 273 is composed of a plurality of arcuate surfaces.

Figure 3:
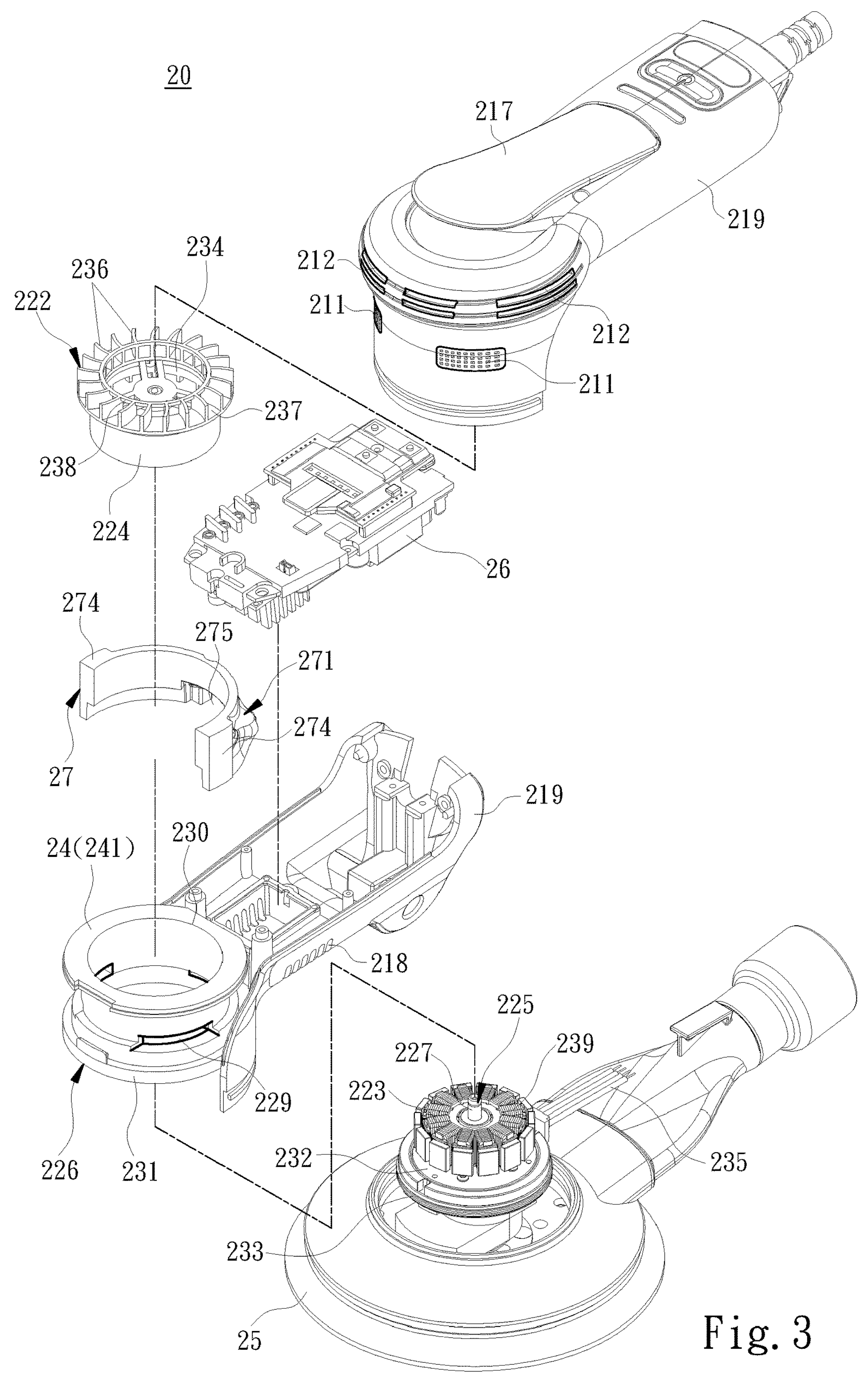
FIG. 3 is an exploded perspective structural view of an embodiment of the tool grinding machine of the invention.
Figure 9:
FIG. 9 is a top view of a deflector of an embodiment of the tool grinding machine of the invention.
Figure 9:
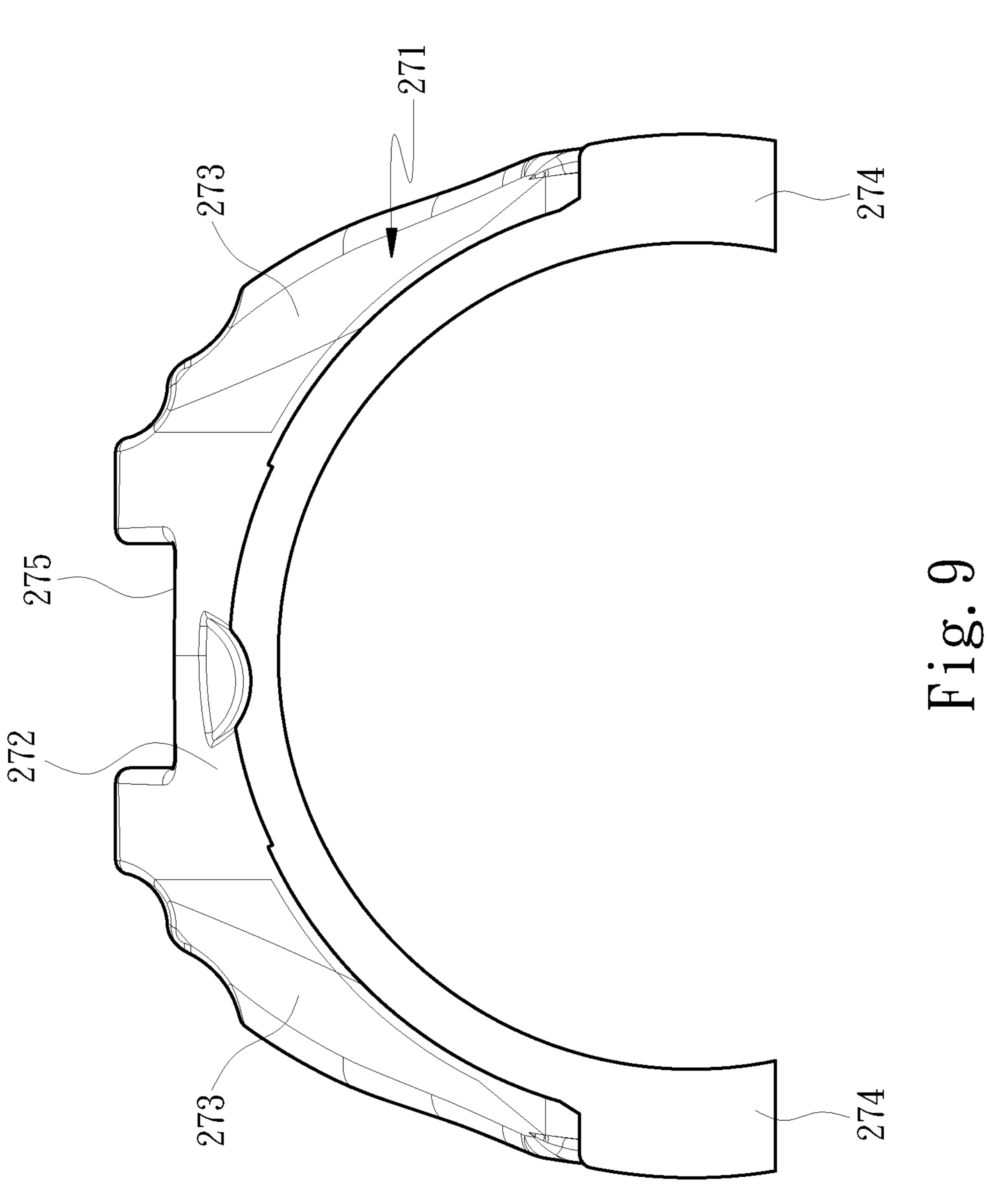

Please refer to FIG. 3 and FIG. 9. In one embodiment, the deflector 27 is disposed close to an edge of the motor housing 226 and is in an arcuate shape. It should be noted that the deflector 27 does not cover the first opening 229. In addition, the deflector 27 comprises two flow stop blocks 274 respectively disposed at two ends of the deflector 27. The two flow stop blocks 274 cooperate with the diversion structure 24 to limit an airflow entering from the air inlet 211 to enter the first opening 229 only. Please refer to FIG. 6 and FIG. 9. In one embodiment, the deflector 27 is further formed with a wire-passing notch 275, and the wire-passing notch 275 provides a wire 235 (shown in FIG. 3) of the motor 221 to pass therethrough to connect with the circuit board 26.

Figure 2:
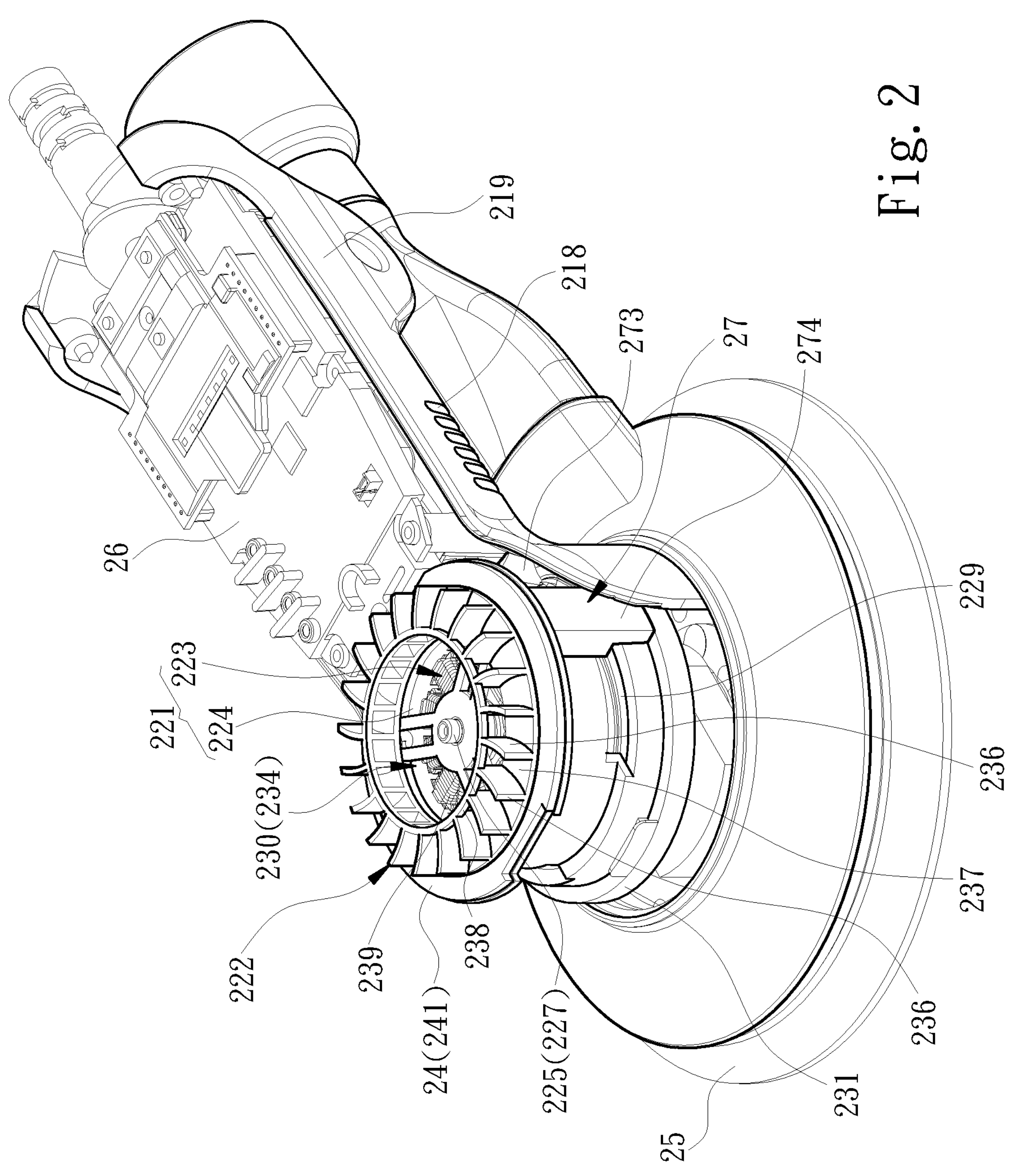
FIG. 2 is a perspective partial structural view of an embodiment of the tool grinding machine of the invention.

Please refer to FIG. 2, in one embodiment, the casing 21 is composed of at least two shells 219, and the motor housing 226 is connected to one of the two shells 219. Further, in one embodiment, the motor housing 226 is integrally formed with one of the at least two shells 219.

What is claimed is:

1. A tool grinding machine, comprising:

a casing, provided for operating the tool grinding machine in a gripping manner, and formed with at least one air inlet and at least one first air outlet, wherein an interior of the casing is divided into a motor space and a grinding space separated from the motor space, and wherein the casing is divided into a head for gripping and a body, and the casing comprises a manipulation pressing plate assembled on the body, and at least one second air outlet;

a driving component, installed in the casing, and comprising a motor and an airflow generator that rotating synchronously with the motor, wherein the motor comprises a stator, a rotor, an output shaft assembled with the rotor, a motor housing disposed around the stator and the rotor, and an airtight support ring assembled with the motor housing, and wherein the output shaft comprises a first end facing the casing and assembled with the airflow generator, and a second end opposite from the casing and assembled with a grinding member, and wherein the motor housing comprises at least one first opening generating a ventilation relationship with the at least one air inlet, at least one second opening communicating with an interior of the motor and facing the airflow generator, and a protruding rib formed on a bottom edge of the motor housing and in contact with an inner wall of the casing, and the protruding rib is assembled with the airtight support ring to divide the interior of the casing into the motor space and the grinding space which are not in communication with each other, a diversion structure, being a baffle disposed on the motor housing, the baffle configured to prevent an airflow from flowing directly from the air inlet to the at least one first air outlet without passing through the at least one first opening; and a deflector, disposed in the casing and located at a junction of the head and the body, and the deflector comprising an air guiding part facing the body, wherein the air guiding part comprises a main guide surface and two auxiliary guide surfaces respectively connected to two sides of the main guide surface;

wherein the tool grinding machine defines a first airflow path and a second airflow path, wherein the first airflow path only performs in the motor space, and is composed of the at least one air inlet, the at least one first opening, the interior of the motor, the at least one second opening, the airflow generator and the at least one first air outlet in sequence, and wherein the second airflow path is defined by the deflector, and is composed of the at least one air inlet, the at least one first opening, the interior of the motor, the at least one second opening, the airflow generator and the at least one second air outlet in sequence.

2. The tool grinding machine as claimed in claim 1, wherein the diversion structure is disposed in the casing and is interposed between the at least one first air outlet and the at least one air inlet.

3. The tool grinding machine as claimed in claim 1, wherein the baffle contacts the inner wall of the casing after the motor housing is assembled.

4. The tool grinding machine as claimed in claim 1, wherein the casing is composed of at least two shells, and the motor housing is connected to one of the at least two shells.

5. The tool grinding machine as claimed in claim 1, wherein the motor comprises an end plate mounted on an end of the motor housing away from the at least one second opening, and the end plate provides the stator to be fixed thereon.

6. The tool grinding machine as claimed in claim 1, wherein each of the two auxiliary guide surfaces is composed of a plurality of arcuate surfaces.

7. The tool grinding machine as claimed in claim 1, wherein the deflector is in an arcuate shape, and the deflector comprises two flow stop blocks respectively disposed at two ends of the deflector.

8. The tool grinding machine as claimed in claim 1, wherein a level height of the at least one first air outlet on the casing is higher than a level height of the at least one air inlet on the casing.

9. The tool grinding machine as claimed in claim 8, wherein the casing comprises at least one dust filter disposed at the air inlet.

10. The tool grinding machine as claimed in claim 1, wherein the casing comprises at least one dust filter disposed at the air inlet.

11. The tool grinding machine as claimed in claim 1, wherein the airflow generator is a centrifugal fan.

* * * * *